Dec. 22, 1953     A. N. TONGSON     2,663,113
FISHING LINE SINKER
Filed Nov. 10, 1950
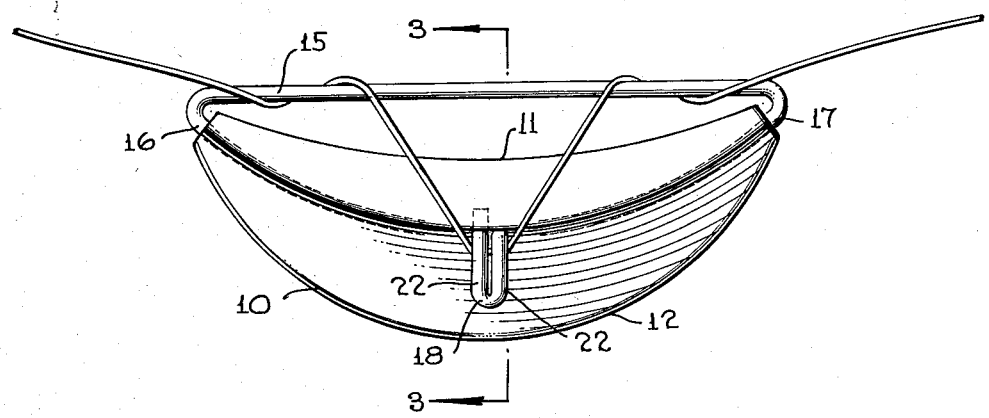
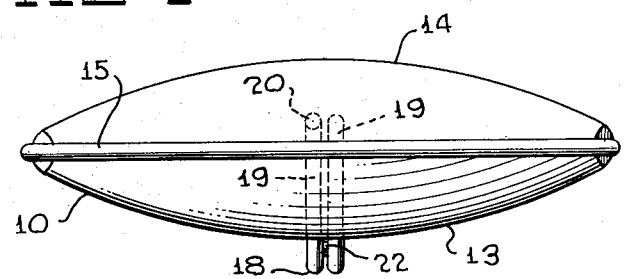
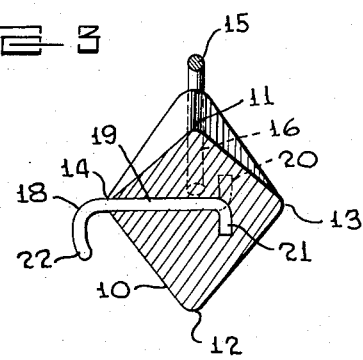
*INVENTOR.*
ADRIAN N. TONGSON
BY
*McMorrow, Berman & Davidson*
ATTORNEYS Patented Dec. 22, 1953

2,663,113

UNITED STATES PATENT OFFICE 2,663,113

FISHING LINE SINKER

Adrian N. Tongson, Chicago, Ill.

Application November 10, 1950, Serial No. 195,050

3 Claims. (Cl. 43—43.1)

This invention relates to fishing line sinkers and more particularly to a sinker for a trolling line.

It is among the objects of the invention to provide an improved fishing line sinker which can be attached to a fishing line intermediate the length of the latter without the necessity of passing an end of the line through any part of the sinker; which is firmly attached to the line against the possibility of accidental release but can be quickly and easily attached and detached, when desired; which can be easily adjusted along the line but will not accidentally slip along the line during use; and which is simple and durable in construction, economical to manufacture, positive and effective in use, and neat and attractive in appearance.

Other objects and advantages will become apparent from a consideration of the following description and the appended claims in conjunction with the accompanying drawing wherein:

Figure 1 is a side elevational view of a fishing line sinker illustrative of the invention shown operatively attached to a fishing line;

Figure 2 is a top plan view of the sinker illustrated in Figure 1; and

Figure 3 is a transverse cross sectional view on the line 3—3 of Figure 1, the fishing line being omitted.

With continued reference to the drawing, the sinker comprises a body 10 of nonbuoyant material, such as lead, which is elongated in shape and symmetrically tapered from its midlength location to its opposite ends. The body has a four-sided or substantially rhomboidal cross sectional shape and is longitudinally curved to provide a concavely curved edge 11 and a convexly curved edge 12 opposite the concavely curved edge 11. The side edges 13 and 14 are also longitudinally curved and the surfaces of the body between the adjacent edges thereof are substantially straight transversely but are longitudinally curved so that the upper surfaces are somewhat concave and the lower surfaces somewhat convex in shape.

This provides a form which passes through the water with minimum resistance and tends to assume a predetermined position in the water when suspended from a fishing line.

A wire bail 15, preferably formed of a corrosion resisting material, such as stainless steel or copper, has a straight intermediate portion which extends along the concavely curved edge 11 of the body 10 and has recurved end portions 16 and 17 at the respectively opposite ends of the intermediate portion which end portions are disposed at an acute angle to the intermediate portion and are curved to substantially coincide with the curved longitudinal center line of the body 10. The end portions 16 and 17 of the bail are cast into the body 10, as is indicated by dotted lines in Figure 1, and extend from the respectively opposite ends of the body 10 to locations adjacent to and disposed at the respectively opposite sides of the mid-length location of the body.

The bail 15 is thus firmly united with the body 10 against any accidental displacement and this bail is of a diametrical size, such that it will not cut or excessively wear a fishing line to which the sinker is attached.

A hook 18 is embedded in the body 10 and projects from the body at one of the side edges of the latter, the hook being illustrated as projecting from the body substantially at the side edge 14. This hook 18 is formed of a doubled length of wire of suitable corrosion resisting material, such as stainless steel or copper, and has a double shank portion 19 extending transversely into the body 10 from one side edge of the body to a location somewhat beyond the center line of the body and between the ends of the end portions 16 and 17 of the bail 15. At its end disposed within the body the two parts of the shank 19 are bent perpendicularly in respectively opposite directions, as indicated at 20 and 21, to firmly secure the hook in the body. The hook also includes a hook portion 22 disposed substantially perpendicular to the shank 19 at the surface of the body and directed away from the bail 15. In the arrangement illustrated the bail and the hook are spaced apart at an angular interval of approximately 90 degrees around the mid-length portion of the body 10.

In attaching the sinker to a line, the line is grasped at a location intermediate the length thereof and the grasped portion of the line is pulled through the space between the bail 15 and the body 10. The line is then brought over the bail providing wraps around the bail disposed one near each end of the latter and the portion of the line between these wraps is then engaged over the hook 18 so that the line cannot unwrap from the bail. The sinker can thus be quickly connected to the line at any desired position along the latter without the necessity of passing an end of the line through any part of the sinker, and when so attached, will be retained in position longitudinally of the line against accidental slippage along the line.

The sinker can be quickly detached from the line by simply disengaging the line from the hook 18 and pulling it away from the bail 15. Thus, the sinker of the present invention can be used on a trolling line without any material risk of losing a catch because of the presence of the sinker. The sinker can be adjusted along the line by simply pulling the line in at one side of the hook 18 and permitting it to run out at the opposite side of the hook. However, when the line is subjected to tension at both sides of the sinker, the sinker cannot slip along the line.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A fishing line sinker comprising an elongated curved body of nonbuoyant material symmetrically tapered from its midlength location toward its opposite ends and having a rhomboidal cross sectional shape and having a concavely curved edge, said body having an arcuate longitudinal axis, a bail having acutely bent ends secured axially in said body at the ends of the latter, said bail extending along and adjacent to said concave edge, and a hook projecting laterally from said body intermediate the length of the latter and extending substantially at right angles to the plane of said bail, said hook being directed away from said bail to hold a portion of a fishing line wrapped around said bail near the opposite ends of the latter and extending from the ends thereof.

2. A fishing line sinker comprising an elongated body tapered from a location intermediate its length toward both ends thereof and longitudinally curved to provide a concave surface portion extending longitudinally from one end to the other end thereof, said body having an arcuate longitudinal axis, a bail including a substantially straight intermediate portion extending along said concave surface portion from one end of said body to the other end, said bail having acutely bent end portions projecting axially one into each end of said body, and a hook having a shank embedded in and extending transversely of said body intermediate the length of the latter and being substantially at right angles to the plane of said bail, said hook having a hook formation extending from said shank at the surface of said body in a direction away from said bail.

3. A fishing line sinker comprising an elongated body tapered from a location intermediate its length toward both ends thereof and longitudinally curved to provide a concave surface portion extending longitudinally from one end to the other end thereof, said body having an arcuate longitudinal axis, a bail including a substantially straight intermediate portion extending along said concave surface portion from one end of said body to the other end, said bail having acutely bent end portions projecting axially one into each end of said body, and a hook having a shank embedded in and extending transversely of said body intermediate the length of the latter and being substantially at right angles to the plane of said bail, said hook having a hook formation extending from said shank at the surface of said body in a direction away from said bail, said bail comprising a wire member of substantial diameter to avoid cutting or abrading a fishing line and said hook comprising a doubled wire member.

ADRIAN N. TONGSON.

References Cited in the file of this patent

UNITED STATES PATENTS

| Number | Name | Date |
|---|---|---|
| D. 87,711 | Cheney | Sept. 6, 1932 |
| 702,955 | Johnson | June 24, 1902 |
| 1,897,291 | Andrews | Feb. 14, 1933 |
| 1,943,192 | Semar | Jan. 9, 1934 |
| 2,187,991 | Tyler | Jan. 23, 1940 |
| 2,257,415 | Gerdin | Sept. 30, 1941 |
| 2,495,572 | Deutsch | Jan. 24, 1950 |
| 2,539,162 | Redding | Jan. 23, 1951 |
| 2,548,291 | Dolejs | Apr. 10, 1951 |
| 2,548,355 | Dolejs, Sr. | Apr. 10, 1951 |